Jan. 4, 1955     M. L. COOPER     2,698,540
PROPORTIONING CAPSULE FILLING DEVICE
Filed April 19, 1951
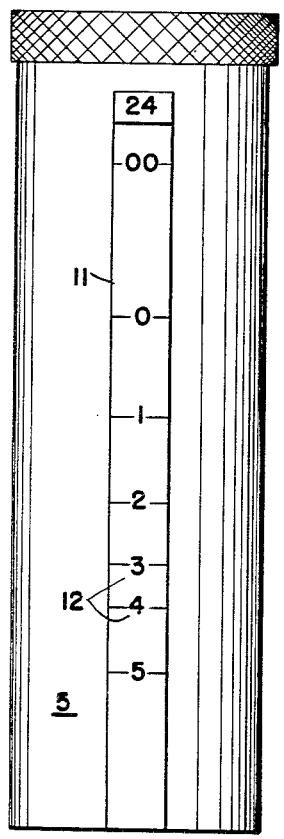
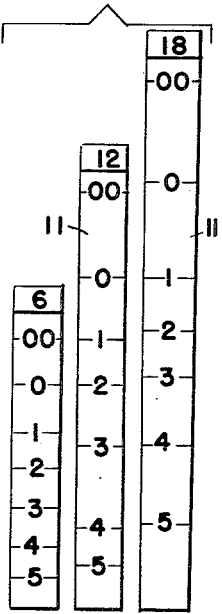
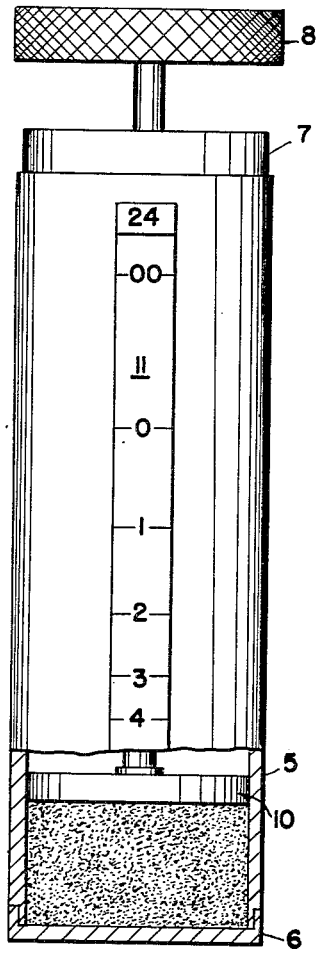
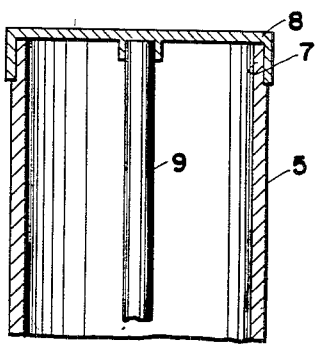
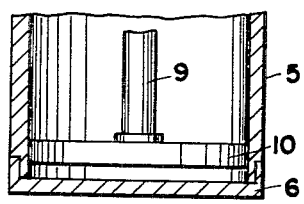
INVENTOR.
MORRIS J. COOPER
BY
*J. T. Dowling*

2,698,540

PROPORTIONING CAPSULE FILLING DEVICE

Morris L. Cooper, Baltimore, Md.

Application April 19, 1951, Serial No. 221,879

1 Claim. (Cl. 73—427)

This invention relates to a device to be used in filling capsules and to determine such filling on a proportioned volume basis.

In the pharmaceutical field and other fields where capsules are needed to carry a certain material, it has long been a problem to determine the size capsule that will utilize the entire amount of compound called for and also to stay within the prescribed number of capsules to be filled and specified in the prescription or formula being filled.

The principal object of my invention is to provide a container or vial having depicted thereon a scale or determining element wherein the compound in the vial may readily determine by number the size of capsule to be used to meet the required number of capsules prescribed.

A further object of my invention is the provision of a vial or measuring container having arranged thereon, either by printed label or impregnated therein, a series of scales having numerals at the tops thereof, denoting the number of capsules required in a formula or prescription, and vertically arranged on these scales are digits from double naught to five, which is the determining factor denoting the size of capsule to fill the prescription or formula, and a closure and tamper for said measuring container, so that compounds placed therein may be packed either loosely or tightly as necessary until the determining digit of size of capsule required is found.

With these and other objects in view, the invention consists of certain novel features, combination and arrangement of parts as will be hereinafter more fully described, pointed out in the accompanying drawing, and claimed.

In the drawing,

Figure 1 is a front elevational view of my improved invention in closed position;

Figure 2 is a front elevational view, partly in section, illustrating the closure in partially open position;

Figure 3 is a fragmentary, vertical, sectional view, showing the closure in full closed position and the tamper omitted;

Figure 4 is a fragmentary sectional view, illustrating the tamper in the container adjacent the bottom thereof, and also illustrates a removable bottom; and, Figure 5 are plan views of the scales used in connection with the container, showing the proper digits thereon.

In the present practice, particularly in medicine, the pharmacist upon receiving a prescription calling for a certain number of capsules, will, after compounding the medicament, select a capsule the size of which he considers adequate. The medicament is then packed into one capsule and the weight checked against that of an empty capsule to determine whether the capsule is adequate or too large. When this factor has been determined the entire amount of the preparation, as outlined in the prescription, is packed into the remaining number of prescribed capsules. Many times, as the last capsule is packed, it is found that a quantity of the medicament is still available which then necessitates the opening of all the capsules and packing an additional amount into each one until the entire amount of the medicament has been utilized.

Further, in the present practice and particularly when a prescription comes to a druggist, the prescription is properly read and the materials noted, they are mixed together and poured into my improved vial. The prescription calls for a given number of capsules, so immediately the mixed compound is dumped or poured into the container, the size of capsule is immediately determined by the digit on the scale, thus eliminating all waste and unnecessary time element in the present day method and also positively assuring the proper quantities as prescribed being in each capsule, which capsule, size and number have also been defined.

The above quotations show the distinction between the old and new, and further, my new invention immediately determines the capsule size and illustrates that it operates on a volume to volume basis.

As explained, after compounding the medicament it will be dumped into my improved container, having graduations corresponding to the capsule size required for a prescribed dosage. The matter is then packed lightly in said container and a direct reading is taken from the desired graduated scale, thereby giving the proper capsule size.

For an illustration, in Figures 1 and 2, a prescription calls for a certain compound to be packed into 24 capsules. The druggist determines the medicament desired and compounds the same, and he next pours the medicament into the graduated container. Knowing that 24 capsules are required, he will immediately note the scale marked "24" and note the capsule size graduation to which the medicament comes closest. If the amount falls between two standard sizes, he will then select the nearest one and pack each capsule accordingly, that is, pack them somewhat loose or tight, so that the proper medicament in the proper prescribed number of capsules is accomplished.

It can be seen that in the use of this type of device there is no hit or miss system. The graduated scale has a determining number of capsules required that is denoted in all formulas and prescriptions, the same as the medicament or formula prescribed is noted. When this is compounded and poured into the vial, the size required to meet the number of capsules prescribed is immediately determined, which makes a cleaner and less expensive method of filling prescriptions or formulas proportioned on a volume to volume basis.

To provide such a device, my invention has a container 5 of any material suitable for the purpose and preferably transparent. It is illustrated as a circular, tubular member having both ends open, its bottom end being closed by a closure 6, so that the same may be readily cleaned and kept in sanitary condition, and its upper end reduced, as at 7, to receive a closure cap 8 thereon. This cap is provided centrally of its interior surface with a rod 9 on which is a tamper or packer 10.

Arranged on the outside surface of the container 5 and at spaced distance apart, are vertical scales 11, and each scale has at its top a digit or digits, as illustrated 6, 12, 18, and 24. Any series of numbers can be used and these digit numbers are the numbers prescribed to determine the number of capsules required to carry the compound or prescription or formula being compounded.

Now arranged on each one of these scales vertically, are digits from double naught to five, and they are arranged at spaced distance apart in vertical alignment and are indicated by the numeral 12, and these particular digits designate the size of the capsules. It is well known in the art that there are different sized capsules to meet different conditions and by virtue of the fact that these digits 12 determine the size to meet the required number of capsules demanded makes the device indispensable in compounding and preparing a prescription or formula for use.

It is to be understood that the inventor does not wish to be limited in any way to the configuration or the construction, or the material used in making such a measuring device. The object of my invention is to provide a container with graduation scales thereon and various digits, certain of which determine the number of capsules required by a given prescription or formula, and the other digits determining the size of capsule to be used to meet the requirements of said specified number of capsules.

It will be recognized that the mixing and compounding of formulas and prescriptions is extremely old, and it is to expedite and make possible a more economical and efficient method to define the size of capsule needed in filling prescriptions or formulas, and at the same time assuring of the right size capsule per number of capsules prescribed, which will expedite and save time and labor.

I claim:

A device to determine and select the proper size of capsule to be used in filling a formula or prescription for a measurable quantity of material on a proportioning volume to volume basis, comprising a transparent container having a series of graduated scales arranged exteriorly and vertically on the side of said container, each scale representing the number of capsules normally designated in a given prescription, each scale further having a series of digits vertically arranged for cooperation with the level of the material within said container, and the digit registering with the level of material in the container designating the size of the capsule needed to meet the number prescribed in the formula or prescription.

References Cited in the file of this patent

UNITED STATES PATENTS

| | | |
|---|---|---|
| 999,696 | Brown | Aug. 1, 1911 |
| 1,722,101 | Little | July 23, 1929 |
| 1,844,153 | Giryotas | Feb. 9, 1932 |
| 2,329,437 | Corwin | Sept. 14, 1943 |
| 2,574,727 | Burkett | Nov. 13, 1951 |